(12) United States Patent
Lahr

(10) Patent No.: US 6,882,336 B2
(45) Date of Patent: Apr. 19, 2005

(54) EXPANDABLE AND CONTRACTIBLE KEYBOARD DEVICE

(75) Inventor: Roy J. Lahr, Los Angeles, CA (US)

(73) Assignee: RAST Associates, LLC, Long Beach, CA (US)

( * ) Notice: Subject to any disclaimer, the term of this patent is extended or adjusted under 35 U.S.C. 154(b) by 0 days.

(21) Appl. No.: 10/310,736

(22) Filed: Dec. 5, 2002

(65) Prior Publication Data

US 2003/0137492 A1 Jul. 24, 2003

Related U.S. Application Data

(60) Provisional application No. 60/337,458, filed on Dec. 6, 2001.

(51) Int. Cl.$^7$ ................................................ G09G 5/00
(52) U.S. Cl. .................. 345/168; 345/169; 400/472
(58) Field of Search ................................ 345/168, 169, 345/864, 901; 200/51.11, 512, 268; 400/472

(56) References Cited

U.S. PATENT DOCUMENTS

| | | |
|---|---|---|
| 3,940,758 A | 2/1976 | Margolin |
| 3,995,126 A | 11/1976 | Larson |
| 4,065,649 A | 12/1977 | Carter et al. |
| 4,127,752 A | 11/1978 | Lowthorp |
| 4,158,230 A * | 6/1979 | Washizuka et al. ......... 361/680 |
| 4,396,810 A | 8/1983 | Cover |
| 4,597,681 A | 7/1986 | Hodges |
| 4,661,005 A | 4/1987 | Lahr |
| 4,661,664 A | 4/1987 | Miller |
| 4,677,600 A | 6/1987 | Yoshida |
| 4,951,985 A | 8/1990 | Pong et al. |
| 5,044,798 A | 9/1991 | Roylance et al. |
| 5,084,670 A | 1/1992 | Melenotte |
| 5,141,343 A | 8/1992 | Roylance et al. |
| 5,163,765 A * | 11/1992 | Levy ........................ 400/492 |
| 5,187,644 A | 2/1993 | Crisan |
| 5,212,473 A | 5/1993 | Louis |
| 5,220,521 A | 6/1993 | Kikinis |
| 5,337,346 A | 8/1994 | Uchikura |
| 5,439,304 A | 8/1995 | Phillips et al. |
| 5,457,453 A * | 10/1995 | Chiu et al. ..................... 341/22 |
| 5,459,461 A | 10/1995 | Crowley et al. |
| 5,500,497 A | 3/1996 | Merriman |
| 5,519,569 A | 5/1996 | Sellers |
| 5,575,576 A | 11/1996 | Roysden et al. |
| 5,590,020 A | 12/1996 | Sellers |
| 5,590,382 A | 12/1996 | Kikinis et al. |
| 5,632,373 A | 5/1997 | Kumar et al. |
| 5,648,771 A | 7/1997 | Halgreen et al. |
| 5,666,112 A | 9/1997 | Crowley et al. |
| 5,742,241 A | 4/1998 | Crowley et al. |
| 5,743,666 A | 4/1998 | VanZeeland et al. |
| 5,764,164 A | 6/1998 | Cartablano et al. |
| 5,870,034 A | 2/1999 | Wood |
| 5,938,353 A | 8/1999 | Butler |
| 5,951,178 A | 9/1999 | Lim |
| 5,982,612 A | 11/1999 | Roylance |
| 5,995,025 A | 11/1999 | Sternglass et al. |
| 6,019,530 A | 2/2000 | Lanzetta et al. |
| 6,036,093 A | 3/2000 | Schultz |
| 6,046,730 A | 4/2000 | Bowen et al. |
| 6,056,456 A | 5/2000 | Kinoshita |
| 6,059,470 A | 5/2000 | Myint |
| 6,068,417 A | 5/2000 | Butler |
| 6,087,966 A | 7/2000 | Sato |

(Continued)

FOREIGN PATENT DOCUMENTS

WO    WO 02/073803    9/2002

*Primary Examiner*—Jimmy H. Nguyen
*Assistant Examiner*—Kim Pannell
(74) *Attorney, Agent, or Firm*—Kenyon & Kenyon

(57) ABSTRACT

An expandable keyboard device includes a plurality of keytops arranged on a plurality of elastic webs. Each web corresponds to a single row of keytops.

23 Claims, 6 Drawing Sheets

U.S. PATENT DOCUMENTS

| | | | |
|---|---|---|---|
| 6,092,944 A * | 7/2000 | Butler ..................... 400/492 |
| 6,111,527 A | 8/2000 | Susel |
| 6,121,869 A | 9/2000 | Burgess |
| 6,151,012 A | 11/2000 | Bullister |
| 6,152,627 A | 11/2000 | Watanabe et al. |
| 6,174,097 B1 | 1/2001 | Daniel |
| 6,257,782 B1 | 7/2001 | Maruyama et al. |
| D448,032 S | 9/2001 | Talley |
| 6,327,482 B1 | 12/2001 | Miyashita |
| 6,329,617 B1 | 12/2001 | Burgess |
| 6,370,018 B1 | 4/2002 | Miller, Jr. et al. |
| 6,430,038 B1 | 8/2002 | Helot et al. |
| 6,477,040 B1 | 11/2002 | Horiki |
| 6,628,506 B1 | 9/2003 | Landry et al. |
| 6,665,173 B1 | 12/2003 | Brandenberg et al. |
| 2001/0002647 A1 | 6/2001 | Hayashi |
| 2001/0003450 A1 | 6/2001 | Hemia et al. |
| 2001/0012195 A1 | 8/2001 | Lefort |
| 2001/0028712 A1 | 10/2001 | Lahr |
| 2003/0063939 A1 | 4/2003 | Lin |

* cited by examiner

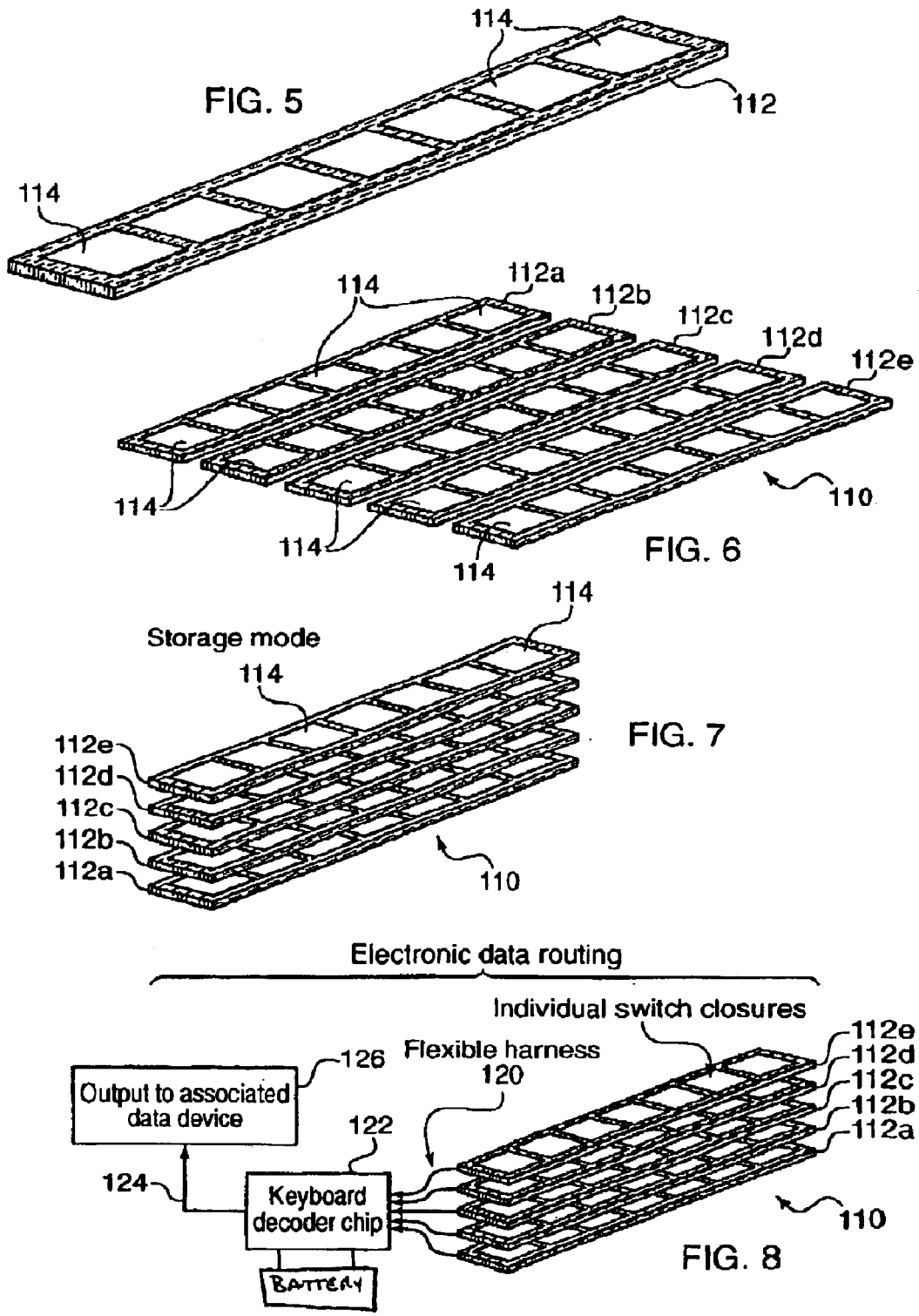

EXPANDABLE AND CONTRACTIBLE KEYBOARD DEVICE

CROSS-REFERENCE TO RELATED APPLICATIONS

The present application claims the benefit of U.S. Provisional Patent Application No. 60/337,458, filed on Dec. 6, 2001, which is expressly incorporated herein in its entirety by reference thereto.

FIELD OF THE INVENTION

The present invention relates to an expandable and contractible keyboard device.

BACKGROUND INFORMATION

Expandable and contractible keyboard devices are described, for example, in U.S. patent application Ser. No. 09/558,866, entitled "Expandable and Contractible Keyboard with Adjustable Key Sizes," and U.S. Patent Application Publication No. 2001/0028712, entitled "Expandable and Contractible Keyboard with Adjustable Key Sizes," each of which is expressly incorporated herein in its entirety by reference thereto.

An expandable and contractible keyboard that includes an elastic web material forming the keytops may undergo substantial narrowing or necking when expanding from the contracted state to the expanded state. Such narrowing or necking is distracting to the user and may subject the keyboard device to contamination by dirt, dust, liquids or other contaminants.

In a formal office setting, a keyboard device may be attached to a data device, such as a desktop computer. However, it is common to use portable data devices away from formal office settings. Other forms of data device include a laptop computer, which may be designed to allow data entry, manipulation and retrieval in almost any location in which the laptop computer may be opened and placed for typing.

A further, even more compact portable data device is the so-called personal digital assistant, or PDA. PDAs typically include a display, which is generally a fraction of the size provided by the display of a laptop or desktop computer but which is fully usable for restricted data handling. The PDA may be configured for input via a stylus, e.g., for tapping on a microsized keyboard on a screen or stroking out alphanumeric characters, e.g., the Graffiti system. Alternatively, the PDA may include a small keyboard with which data is entered by pressing one key at a time, i.e., single-finger typing, e.g., with the forefinger or thumb.

Compact keyboard devices include so-called clamshell devices configured for use, for example, with a cellular phone/PDA combination. Such devices include tiny buttons and a display that may be smaller than typical PDA displays. Since a cellular phone is a wireless device, data access may be permitted in a PDA mode from any location in which satisfactory RF signal transfer is available.

The form factor of a transportable device, e.g., a small cellular phone or slim PDA device, may preclude inclusion of a keyboard device other than a keyboard device that includes very small key buttons. Thus, it is an object of the present invention to provide a keyboard device that provides a compact transportable size and configuration and that is reconfigurable to provide a size and configuration that permits single-finger typing and/or a full-width, e.g., nominal 10½-inch wide keyboard that permits touch-typing. A full-width keyboard may have, for example, a nominal 19 mm center-to-center spacing with an approximately equal row-to-row spacing.

It is another object of the present invention to provide an expandable and contractible keyboard device in which the aforementioned narrowing or necking of the elastic keyboard web is reduced.

It is a further object of the present invention to provide an expandable and contractible keyboard device, which includes a plurality of keytops arranged on a plurality of elastic webs, wherein each web corresponds to a single row of keytops.

SUMMARY

The above and other beneficial objects of the present invention are achieved by providing an expandable keyboard device as described herein.

According to one example embodiment of the present invention, the keyboard device includes an elastic web corresponding to each row of keytops.

The keyboard device may include a plurality of webs stretchable in a first direction between a contracted position and an expanded position and a plurality of keytops arranged on each web, a pitch between adjacent keytops expandable in accordance with expansion of the webs. The webs are superposable in a second direction, and the webs may be superposable in the second direction at least when the webs are in the contracted position. In one example embodiment, the webs may be superposable to form a stacked arrangement of the webs.

The keyboard device may include a keyboard decoder device configured to receive output data from keyswitches corresponding to the keytops, and a battery may be arranged to power the keyboard decoder device.

Each web may be formed of a rubberlike elastomeric material or alternatively by an isolinear fabric, an isolinear stretch material, an expandable fabric, etc. Each keytop may include at least one label woven into or otherwise affixed to the web. At least five webs may be arranged to form five keyboard rows. The keyboard device may include a flexible wiring harness arranged to electrically and logically interconnect the webs.

An overall width of the webs in the expanded position may be, for example, between approximately 10.2 inches and 11 inches.

The keyboard device may include interconnecting circuitry configured to electrically and logically interconnect the webs, and the interconnecting circuitry may include two sets of connectors.

The keytops may be arranged for single-finger data entry when the webs are in the contracted position, and the keytops may be arranged for touch-typing data entry when the webs are in the expanded position.

Each keytop may include at least one printed top, may include contrasting colors, and/or may include a differing weave structure. A designation label for each keytop may be molded into the keytop.

A keyboard device may include several keyrow elements, each row corresponding to, for example, one of the five standard keyboard row patterns. A sixth row of buttons may be provided for, e.g., function keys. This function key row may be fixed in size and not expand when the other five rows of the keybuttons expand. Alternatively, this sixth row of function keys may be eliminated for compactness if the end user is willing to press an auxiliary key, e.g., the ALT key or the CTRL key, and to then press a number or character key to simulate the function keys, e.g., F1 to F9, and to press an auxiliary key, e.g., the ALT key or the CTRL key, and to then press a combination of number and/or character keys so as to simulate the function keys, e.g., F10 to F20. Since the function keys F1 to F20 may be infrequently used, the foregoing arrangement may provide an adequate compromise between functionality and portability.

Since each keyrow is configured as a separate strip or web of keys, it is possible to stack the keyrow elements, e.g., vertically, to form a very compact package for transportation. The resulting storage package may have a substantially square cross-section. By interconnecting each row strip using flexible circuitry, it is possible to maintain connection of the strips when stacked and when placed in a flat and ready position.

Each keyboard row may be constructed on a strip of standard circuit board material, with standard membrane keyswitches affixed and keybuttons attached above each membrane switch. Each keyboard row may be constructed on a strip of standard phenolic plastic circuit board material with copper conductors, with standard membrane keyswitches affixed on the strip. Each circuit strip may be approximately 10.2 to 11 inches wide to provide a full touch-tying keyboard. For a keyboard height of each row of, for example, ⅜ inches, a stacked height of five rows may be approximately 2 inches. Thus, for a circuit board strip having a width of ⅞ to 1 inch, the transportable arrangement of a keyboard device according to the present invention may have the dimensions 2-inches tall by 1-inch wide by 11-inches long. The width may be made less to allow for a more compact storage size, and with keybuttons approximately 9/16" in height. It should be understood that the foregoing dimensions do not reflect the inclusion of a decoder chip or a battery, if the keyboard device does not draw operating power from the associated data device. It is possible to provide wireless communication between the keyboard device and the data device, and, if such wireless communication is provided, a small battery may be required.

A stacked keyboard device having a length of approximately 11-inches may be inconvenient, although the 2-inches by 1-inch cross-section may be practical. Thus, it is possible to provide length-compression by providing a flexible and/or extendable circuit substrate on which to form the keyboard row. One possible arrangement is described below.

Mini Jacquard looms may be capable of sequencing substantially long patterns. For example, an 11-inch-wide keyboard having five rows of a web material requires approximately 60-inches in length of the web material, including inter-row spaces to form the pattern. The web may be formed of a material that provides an iso-linear stretch, i.e., stretchable in one direction, e.g., width, but does not narrow, e.g., in height, during expansion. Using such a loom, the five keyboard rows may be formed in sequence, one after another, to form a single long strip, after which the pattern may be restarted.

Depending on the capabilities and resolution of the loom, it may be possible to weave the keyboard labels, e.g., letters, numerals, other characters, etc., onto the web, or it may be possible to weave an outline of the keytops, the labels being later printed. Since the web is elastic, it is possible to provide a keyboard having a width of approximately 5¼ inches for compact, single-finger typing and being expandable to a width of approximately 10½ inches for touch-typing, with, for example, a 19 mm nominal spacing between key button centers.

A keyboard device formed of a single elastic strip divided into, e.g., five, keyboard rows may provide certain benefits. One such benefit is providing sufficient inter-row spacing while allowing for compact, flat storage. If the keyboard is stored flat, for example, for transportation to save space, the keyboard rows may be stored adjacent to each other, e.g., vertically, to minimize storage space. Upon expansion, the keyrows may be separated to provide comfort when touch-typing, that is, the finger placement need not be so precise when finding the keytop, and typing may be more relaxed. For example, one woven web, i.e., each keyrow, may be approximately ⅝ inches wide, so that when arranged as a keyboard, the vertical center-to-center spacing is approximately ⅝ inches or approximately 15 mm. It may be desirable to widen row-to-row spacing for touch-typing, i.e., when the rows are expanded to approximately 10½ inches, so that at least approximately 19 mm or 21 mm row-to-row spacing is provided. Thus, an additional, e.g., 4 mm, row-to-row vertical spacing may be provided when the keyboard is arranged at its expanded width, e.g., at the 10½-inch touch-typing width.

Another benefit of the keyboard device according to the present invention is that the keyboard device may be transportable at its minimum elastic length for each row, as may be permitted by the particular elastic fabric weave. For example, a two-to-one stretch may be possible, so that a keyboard with an expanded, e.g., touch-typing, width of approximately 10½ inches may be allowed to contract to approximately one-half that length, e.g., 5¼ inches. The width of the keyboard device in the contracted state may permit single-finger typing.

It should be appreciated that the transport length may be shortened or that the contracted-width to expanded-width ratio may be, for example, three-to-one or higher, in accordance with an appropriate elastic fabric. Such fabrics may provide for a keyboard device having transport dimensions of, for example, 1-inch by 2-inches by 4-inches. Special fabric finish processes may be used in forming such fabrics, such as wet processing followed by rapid heating to reduce the net stretch-out ratio. Special fabric finish processes are often used, such as wet processing followed by rapid heating to reduce the moisture retained in the fabric. Such aggressive finish processes may reduce the as-woven net stretch-out ratio. Alternatively, a spin drying process with little or no heating may increase the final stretch-out ratio, essentially preserving the as-woven characteristics.

BRIEF DESCRIPTION OF THE DRAWINGS

FIG. 5 is a perspective view of a single row of an expandable keyboard device according to the present invention.

FIG. 6 is a perspective view of the expandable keyboard device according to the present invention in a keyboard mode.

FIG. 7 is a perspective view of the expandable keyboard device according to the present invention in a storage mode.

FIG. 8 is a schematic view of the expandable keyboard device according to the present invention in the storage mode.

DETAILED DESCRIPTION

Figure 1:
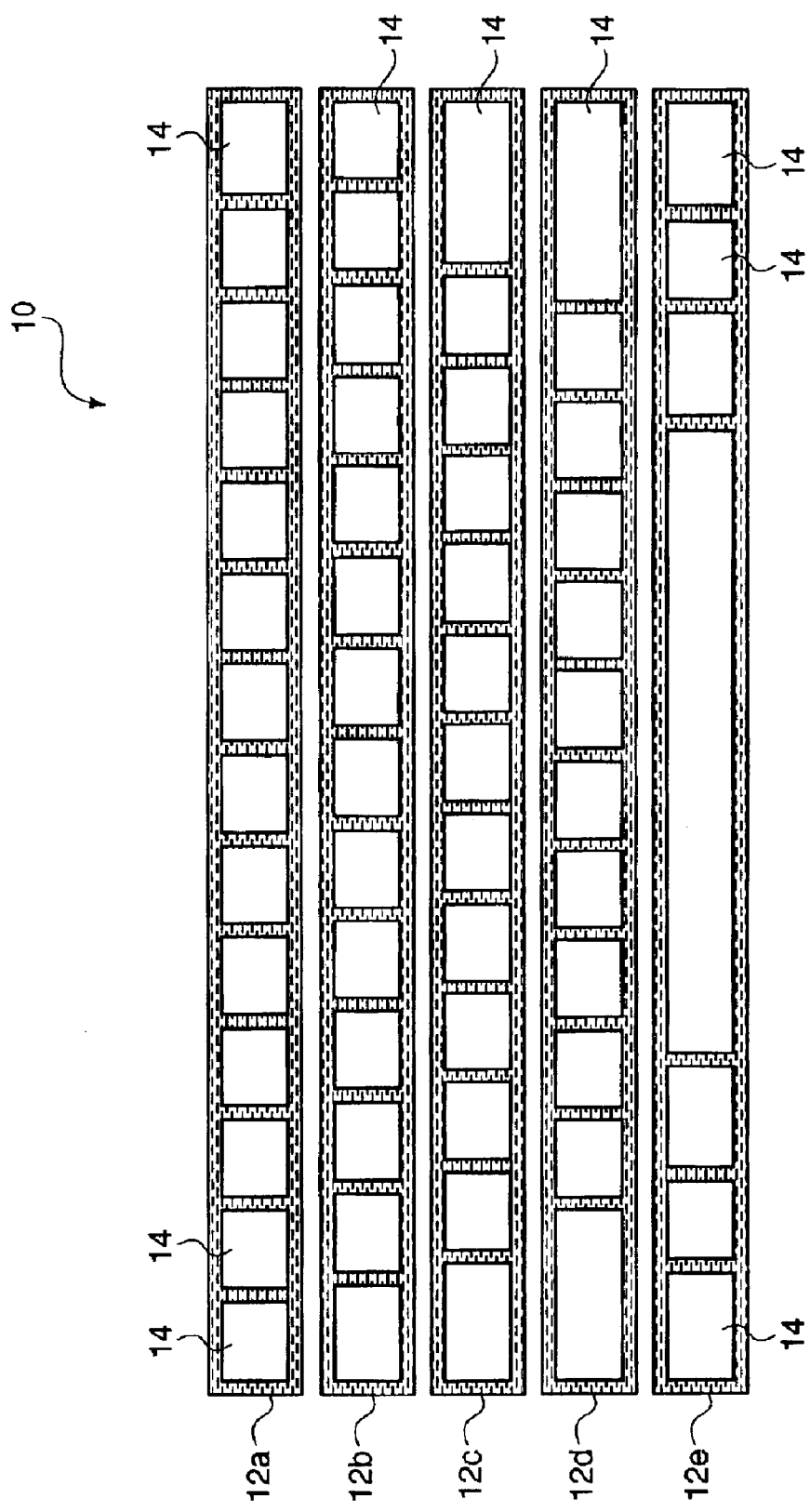
FIG. 1 is a top plan view of an expandable keyboard device according to the present invention.

FIG. 1 is a top plan view of an expandable keyboard device 10 according to the present invention. The keyboard device 10 includes a plurality of webs 12a, 12b, 12c, 12d, 12e, each in the form of an elastic strip, formed of, for example, an expandable fabric, an elastomer, etc. Each web 12a, 12b, 12c, 12d, 12e includes a plurality of keytops 14. Each keytop 14 corresponds to a respective keyswitch arranged beneath the keytops 14. The keyswitches are movable and/or expandable in accordance with the expansion and contraction of the webs 12a, 12b, 12c, 12d, 12e. Possible arrangement of the keyswitches are described, for example, in U.S. patent application Ser. No. 09/558,866, entitled "Expandable and Contractible Keyboard with Adjustable Key Sizes," and U.S. Patent Application Publication No. 2001/0028712, entitled "Expandable and Contractible Keyboard with Adjustable Key Sizes."

Each web 12a, 12b, 12c, 12d, 12e may be formed of a woven, elastic material, and the keytops 14 may be woven into the fabric by, for example, a continuous Jacquard process.

Figure 2:
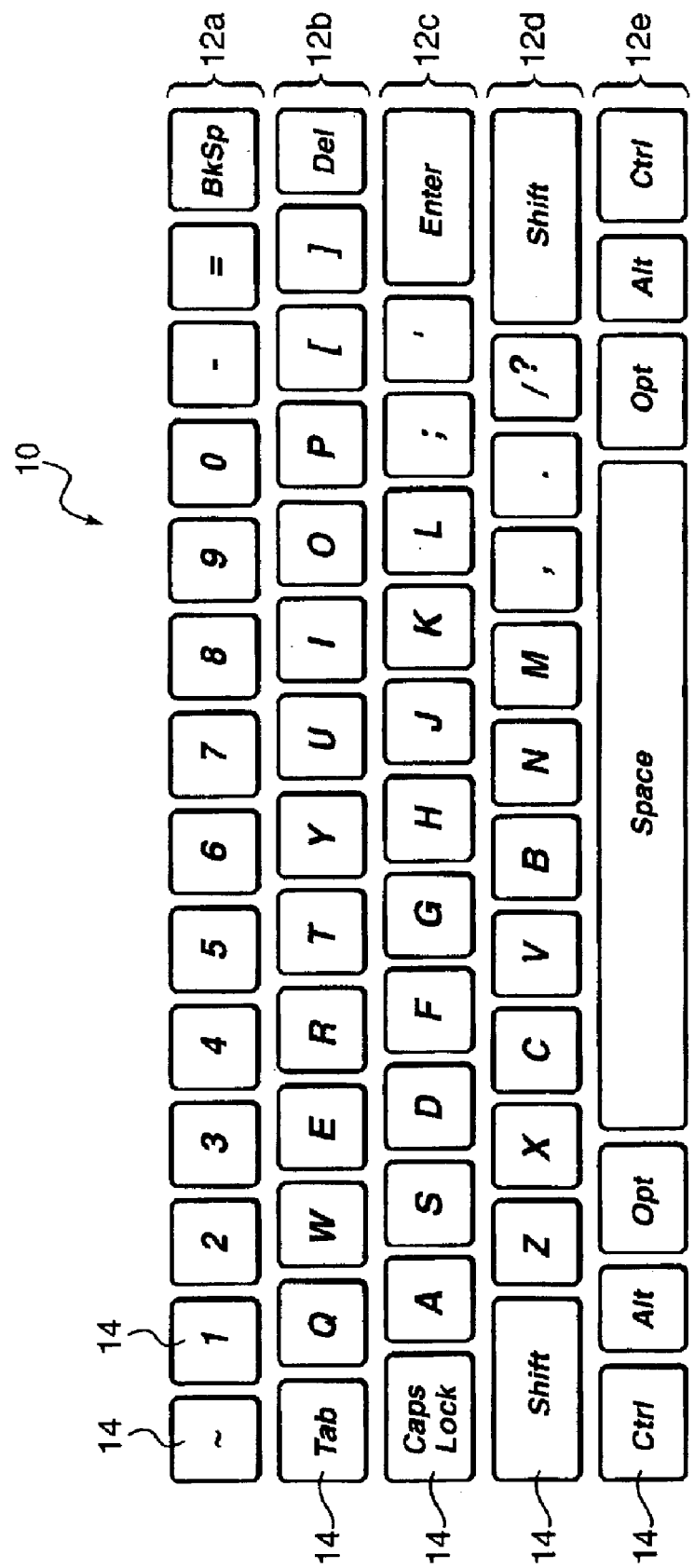
FIG. 2 is another top plan view of the expandable keyboard device according to the present invention.

FIG. 2 is another top plan view of the keyboard device 10 according to the present invention. FIG. 2 illustrates the keytops 14 provided with an indication of the corresponding character or keyswitch function according to the standard QWERTY arrangement, a non-US variation thereof, e.g., AZERTY, and a standard personal computer operating system arrangement. The corresponding character/function may be printed on the keytops 14 using a dye sublimation, ink jet or other printing process, or the corresponding character/function may be woven into the keytops 14. The corresponding character/function may also be molded into the keytops 14. If woven into the keytops 14, the corresponding character/function may be indicated by, for example, a contrasting color, a complementary color or by the structure of the weave.

Figure 3:
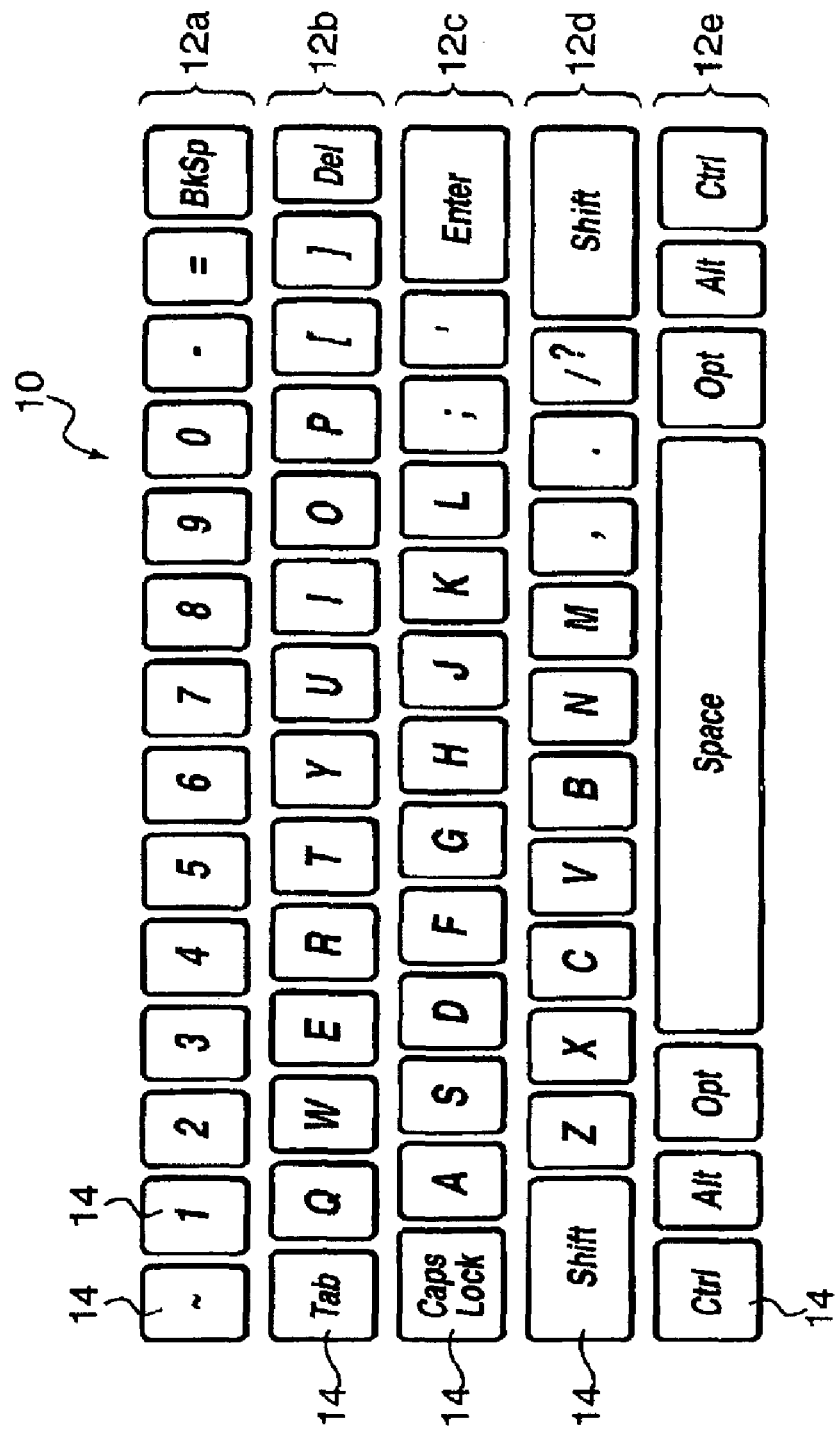
FIG. 3 is a top plan view of the expandable keyboard device according to the present invention in a contracted state.
Figure 4:
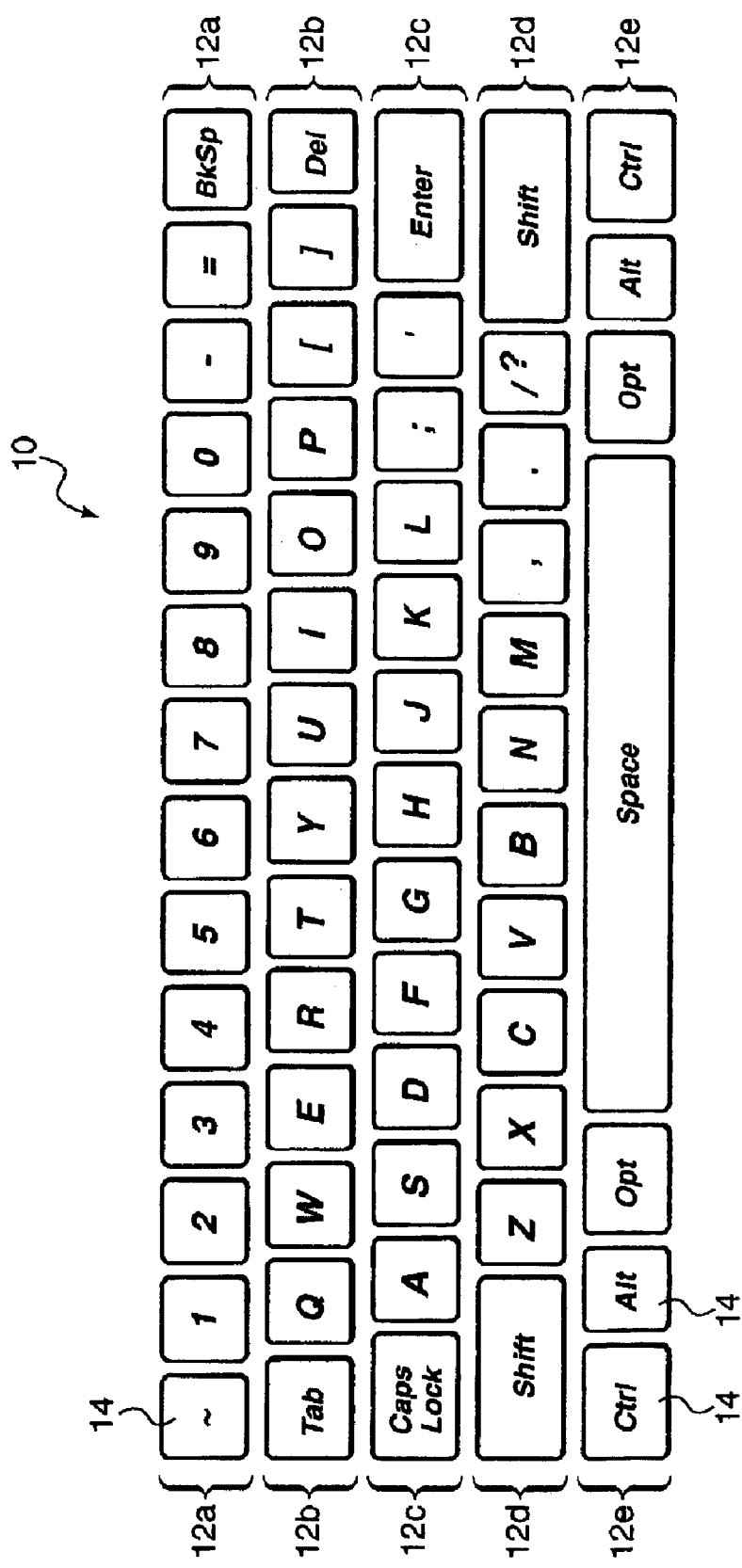
FIG. 4 is a top plan view of the expandable keyboard device according to the present invention in an expanded state.

FIG. 3 is a top plan view of the keyboard device 10 in a contracted state, and FIG. 4 is a top plan view of the keyboard device 10 in an expanded state. It should be appreciated that in the expanded state, the keyboard device 10 provides a size and configuration that may permit "touch-typing" and provides a size and configuration that may approximate a standard keyboard size. In the contracted state, the keyboard device 10 provides a size and configuration that may permit "single-finger" typing for use when entering a limited amount of data, such as, when preparing a short message or correcting a telephone number.

FIG. 5 is a perspective view of a single row of the expandable keyboard device according to the present invention, the single row including a fabric web 112 having a plurality of keytops 114 formed thereon. FIG. 5 represents a single row of the expandable keyboard device according to the present invention that may be constructed on a stretchable base as a woven material.

FIG. 6 is a perspective view of the expandable keyboard device 110 according to the present invention. Keyboard device 110 includes a plurality of webs 112a, 112b, 112c, 112e, 112e, each forming a single row of keytops 114. As illustrated in FIG. 6, the keyboard device 110 includes five webs 112a, 112b, 112c, 112d, 112e. It should be understood that keyboard device 110 may include any number of rows of webs as appropriate. FIG. 6 illustrates the keyboard device 110 in a keyboard mode, in which the webs 112a, 112b, 112c, 112d, 112e are aligned to present a standard keyboard shape and configuration (e.g., for single-finger typing). The webs 112a, 112b, 112c, 112d, 112e may be stretched or expanded to form a full-size keyboard, e.g., for touch typing.

FIG. 7 is a perspective view of the expandable keyboard device 110 illustrated in FIG. 6 in a storage mode. As illustrated in FIG. 7, the webs 112a, 112b, 112c, 112d, 112e are arranged in a single stack for a compact storage configuration or for compact storage of keyboard elements.

FIG. 8 is a schematic view of the keyboard device 110 according to the present invention. Each web 112a, 112b, 112c, 112d, 112e are connected via a flexible harness 120 to a keyboard decoder device 122, and the keyboard decoder device 122, e.g., a keyboard decoder chip, is connected or connectable to a data device 126 by line 124.

Figure 9:
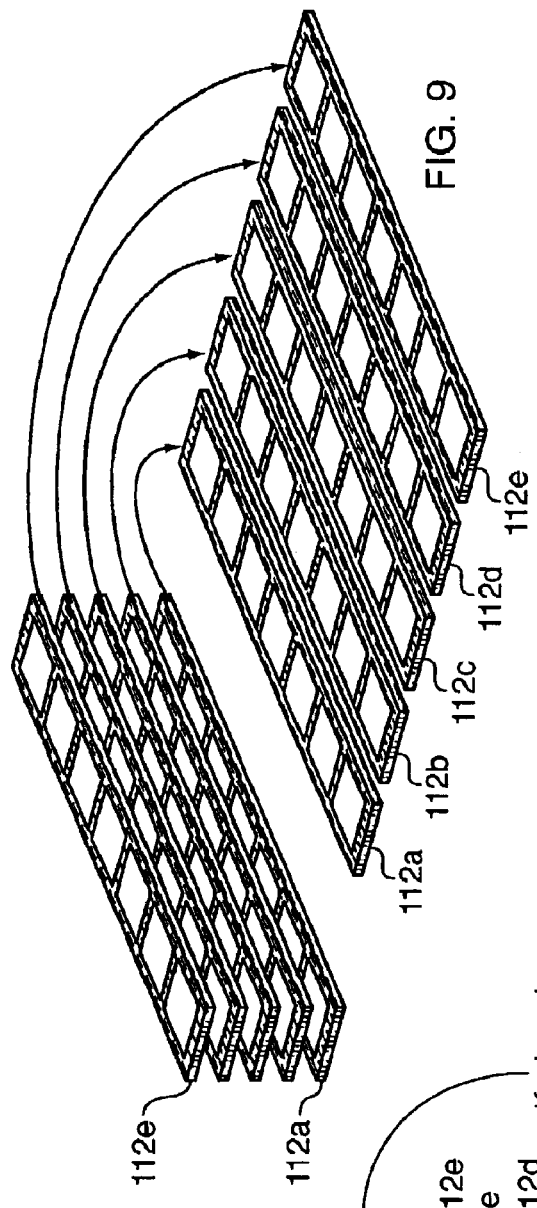
FIG. 9 is a perspective view of the expandable keyboard device according to the present invention illustrating an expansion and a contraction operation.

FIG. 9 is a perspective view of the expandable keyboard device 110 according to the present invention. The left-hand side of FIG. 9 illustrates the keyboard device 110 in the storage mode, and the right-hand side of FIG. 9 illustrates the keyboard device 110 in the keyboard mode.

Figure 11:
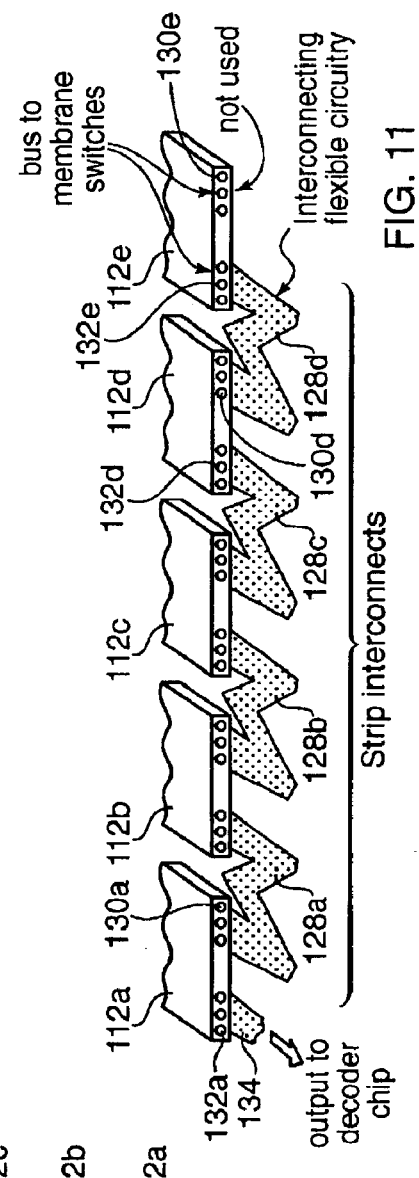
FIG. 11 is a perspective view of the interconnecting circuitry of the expandable keyboard device according to the present invention in an expanded, or ready-to-use keyboard, state.
Figure 10:
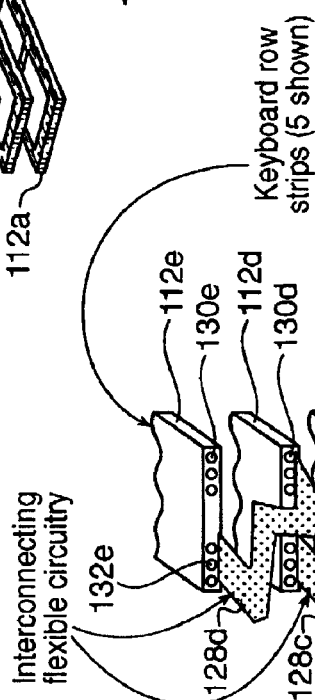
FIG. 10 is a perspective view of interconnecting circuitry of the expandable keyboard device according to the present invention in a contracted state.

FIG. 10 is a perspective view of the keyboard device 110 illustrating the interconnecting circuitry thereof. Each web 112a, 112b, 112c, 112d, 112e includes two sets of connectors 130a, 132a, 130b, 132b, 130c, 132c, 130d, 132d, 130e, 132e. Interconnecting flexible circuit 128a electrically and logically connects connectors 130a and 132b, interconnecting flexible circuit 128b electrically and logically connects connectors 130b and 132c, interconnecting flexible circuit 128c electrically and logically connects connectors 130c and 132d, and interconnecting flexible circuit 128d electrically and logically connects connectors 130d and 132e. Circuit 134 connects connector 132a to decoder device 122. FIG. 10 illustrates the keyboard device 110 in the storage mode—stacked for compactness—, and FIG. 11 illustrates the keyboard device 110 in the keyboard mode. As illustrated in FIG. 11, since web 112e is an end row, connector 130e is not connected to an interconnecting flexible circuitry. The connectors 130a to 130e may provide a bus to membrane keyswitches.

What is claimed is:

1. A keyboard device, comprising:
   a plurality of webs stretchable in a single plane in a first direction between a contracted position and an expanded position; and
   a plurality of keytops arranged on each web, a pitch between adjacent keytops expandable in the single plane in accordance with expansion of the webs;
   wherein the webs are superposable in a second direction; and
   wherein the webs are superposable in the second direction at least when the webs are in the contracted position.

2. The keyboard device according to claim 1, further comprising a keyboard decoder device configured to receive output data from keyswitches corresponding to the keytops.

3. The keyboard device according to claim 1, wherein each web is formed of an elastomeric material.

4. The keyboard device according to claim 1, further comprising a flexible wiring harness arranged to electrically and logically interconnect the webs.

5. The keyboard device according to claim 1, wherein an overall width of the webs in the expanded position is between approximately 10.5 inches and 11 inches.

6. The keyboard device according to claim 1, further comprising interconnecting circuitry configured to electrically and logically interconnect the webs.

7. The keyboard device according to claim 6, wherein the interconnecting circuitry includes two sets of connectors.

8. The keyboard device according to claim 1, wherein the webs are superposable to form a stacked arrangement of the webs.

9. The keyboard device according to claim 1, wherein each keytop includes at least one printed top.

10. The keyboard device according to claim 1, wherein the keytops include contrasting colors.

11. The keyboard device according to claim 1, wherein a designation is molded into the each keytop.

12. The keyboard device according to claim 1, wherein an overall width of the webs in the expanded position is between approximately 10 inches and 11 inches.

13. The keyboard device according to claim 1, wherein each web corresponds to at least one keyboard row.

14. A keyboard device comprising:
a plurality of webs stretchable in a single plane in a first direction between a contracted position and an expanded position; and
a plurality of keytops arranged on each web, a pitch between adjacent keytops expandable in the single plane in accordance with expansion of the webs;
a keyboard decoder device configured to receive output data from keyswitches corresponding to the keytops; and
a battery arranged to power the keyboard decoder device;
wherein the webs are superposable in a second direction.

15. A keyboard device, comprising:
a plurality of webs stretchable in a single plane in a first direction between a contracted position and an expanded position; and
a plurality of keytops arranged on each web, a pitch between adjacent keytops expandable in the single plane in accordance with expansion of the webs;
wherein the webs are superposable in a second direction; and
wherein each web is formed from an iso-linear stretch material.

16. A keyboard device, comprising:
a plurality of webs stretchable in a single plane in a first direction between a contracted position and an expanded position; and
a plurality of keytops arranged on each web, a pitch between adjacent keytops expandable in the single plane in accordance with expansion of the webs;
wherein the webs are superposable in a second direction and
wherein each keytop includes at least one label woven into the web.

17. A keyboard device, comprising:
a plurality of webs stretchable in a single plane in a first direction between a contracted position and an expanded position; and
a plurality of keytops arranged on each web, a pitch between adjacent keytops expandable in the single plane in accordance with expansion of the webs;
wherein the webs are superposable in a second direction; and
wherein the plurality of webs includes at least five webs arranged to form five keyboard rows.

18. A keyboard device, comprising:
a plurality of webs stretchable in a single plane in a first direction between a contracted position and an expanded position; and
a plurality of keytops arranged on each web, a pitch between adjacent keytops expandable in the single plane in accordance with expansion of the webs;
wherein the webs are superposable in a second direction; and
wherein the keytops are arranged for single-finger data entry when the webs are in the contracted position.

19. A keyboard device, comprising:
a plurality of webs stretchable in a single plane in a first direction between a contracted position and an expanded position; and
a plurality of keytops arranged on each web, a pitch between adjacent keytops expandable in the single plane in accordance with expansion of the webs;
wherein the webs are superposable in a second direction; and
wherein the keytops are arranged for touch-typing data entry when the webs are in the expanded position.

20. A keyboard device, comprising:
a plurality of webs stretchable in a single plane in a first direction between a contracted position and an expanded position; and
a plurality of keytops arranged on each web, a pitch between adjacent keytops expandable in the single plane in accordance with expansion of the webs;
wherein the webs are superposable in a second direction; and
wherein the webs are formed from an expandable fabric.

21. A keyboard device, comprising:
a plurality of webs stretchable in a single plane in a first direction between a contracted position and an expanded position; and
a plurality of keytops arranged on each web, a pitch between adjacent keytops expandable in the single plane in accordance with expansion of the webs;
wherein the webs are superposable in a second direction; and
wherein each web corresponds to a respective row of keys of the keyboard device.

22. A keyboard device, comprising:
a plurality of webs stretchable in a single plane in a first direction between a contracted position and an expanded position; and
a plurality of keytops arranged on each web, a pitch between adjacent keytops expandable in the single plane in accordance with expansion of the webs;
wherein the webs are superposable in a second direction; and
wherein the plurality of webs includes at least three webs arranged to form five keyboard rows.

23. A keyboard device, comprising:
a plurality of webs stretchable in a single plane in a first direction between a contracted position and an expanded position; and
a plurality of keytops arranged on each web, a pitch between adjacent keytops expandable in the single plane in accordance with expansion of the webs;
wherein the webs are superposable in a second direction; and
wherein each web corresponds to at least one keyboard row.

* * * * *